United States Patent
Zhang et al.

(10) Patent No.: US 9,225,654 B2
(45) Date of Patent: Dec. 29, 2015

(54) METHOD AND APPARATUS FOR SENDING PACKET

(71) Applicant: Huawei Technologies Co., Ltd., Shenzhen (CN)

(72) Inventors: Yongping Zhang, Beijing (CN); Jun Liu, Beijing (CN); Zhenghai Gao, Beijing (CN); Fengli Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 14/159,128

(22) Filed: Jan. 20, 2014

(65) Prior Publication Data

US 2014/0133309 A1    May 15, 2014

Related U.S. Application Data

(63) Continuation of application No. PCT/CN2012/078235, filed on Jul. 5, 2012.

(30) Foreign Application Priority Data

Jul. 25, 2011    (CN) .......................... 2011 1 0209059

(51) Int. Cl.
*H04L 12/819* (2013.01)
*H04L 12/801* (2013.01)

(52) U.S. Cl.
CPC ............... *H04L 47/215* (2013.01); *H04L 47/34* (2013.01)

(58) Field of Classification Search
None
See application file for complete search history.

(56) References Cited

U.S. PATENT DOCUMENTS

| | | | |
|---|---|---|---|
| 6,970,426 B1* | 11/2005 | Haddock | 370/235.1 |
| 2005/0078602 A1* | 4/2005 | Mancour et al. | 370/230 |
| 2005/0111359 A1* | 5/2005 | Onoe et al. | 370/229 |
| 2006/0268719 A1* | 11/2006 | Takase et al. | 370/235.1 |

(Continued)

FOREIGN PATENT DOCUMENTS

| | | |
|---|---|---|
| CN | 1549511 A | 11/2004 |
| CN | 1589542 A | 3/2005 |

(Continued)

OTHER PUBLICATIONS

European Search Report dated Sep. 25, 2014 for Application No. 12818328.2, 9 pages.

(Continued)

*Primary Examiner* — Gary Mui
(74) *Attorney, Agent, or Firm* — Slater & Matsil, L.L.P.

(57) ABSTRACT

A method for sending a packet includes determining whether a packet is a fragmented packet, if the packet is a fragmented packet, determining whether the number of tokens in a token bucket is sufficient, when the number of tokens in the token bucket is sufficient, sending the fragmented packet, and deducting the number of tokens in the token bucket, where the deducted number of tokens corresponds to the number of bytes of the sent fragmented packet, when the number of tokens in the token bucket is insufficient, sending the fragmented packet, and deducting the number of tokens in the token bucket, where the deducted number of tokens corresponds to the number of bytes of the sent fragmented packet, and the number of tokens in the token bucket is a negative number after the number of tokens corresponding to the number of bytes of the sent fragmented packet is deducted.

14 Claims, 3 Drawing Sheets

(56) References Cited

U.S. PATENT DOCUMENTS

| | | |
|---|---|---|
| 2007/0153682 A1 | 7/2007 | Swenson et al. |
| 2009/0225711 A1* | 9/2009 | Sammour et al. ............ 370/329 |
| 2011/0075562 A1 | 3/2011 | Isaksson et al. |

FOREIGN PATENT DOCUMENTS

| | | |
|---|---|---|
| CN | 1601963 A | 3/2005 |
| CN | 101110716 A | 1/2008 |
| CN | 101309219 A | 11/2008 |
| CN | 102271086 A | 12/2011 |
| EP | 1354435 A2 | 10/2003 |

OTHER PUBLICATIONS

Kent, C., et al., "Fragmentation Considered Harmful," Computer Communication Review (ACM Press; Proceedings of the ACM SIGCOMM'8/ Workshop), No. 5, Special Issue, Aug. 11-13, 1987, 11 pages.

Third Chinese Office Action received in Chinese Application No. 201110209059.8, mailed Jul. 30, 2014, 8 pages.

"Chinese International Search Report," International Application No. PCT/CN2012/078235, mailing date: Oct. 18, 2012, 11 pages.

* cited by examiner

METHOD AND APPARATUS FOR SENDING PACKET

This application is a continuation of International Application No. PCT/CN2012/078235, filed on Jul. 5, 2012, which claims priority to Chinese Patent Application No. 201110209059.8, filed on Jul. 25, 2011, both of which are hereby incorporated by reference in their entireties.

TECHNICAL FIELD

The present application relates to the field of data communications, and in particular, to a method and an apparatus for sending a packet.

BACKGROUND

Traffic policing is a commonly used network traffic control technology. With the development of times and dramatic increase of network data communications, network traffic is growing at a very high speed. This makes the traffic policing more and more important and frequent.

A current traffic policing technology uses a token bucket to control packet traffic. Before a packet is forwarded, the packet needs to be classified. If the packet complies with a specified traffic feature, whether there are sufficient tokens in the token bucket is checked. If there are sufficient tokens in the token bucket, the packet can be forwarded, and the number of tokens corresponding to the number of forwarded packets is deducted from the token bucket; if tokens in the token bucket are insufficient, the packet is discarded. In this way, traffic of one type of packet can be controlled.

In the current traffic policing technology, the packet feature is not perceived, so a fragmented packet and a complete packet are not treated differently. Therefore, some fragmented packets may be forwarded, while some fragmented packets may be discarded. At a receiving end of the packet, because some fragmented packets are missing, a complete packet cannot be assembled and received fragmented packets have to be discarded. Therefore, a waste of network bandwidths is caused.

SUMMARY OF THE INVENTION

Embodiments of the present application relate to a method and an apparatus for sending a packet, which may prevent that a complete packet cannot be assembled at a receiving end because some fragments in a fragmented packet cannot be sent.

An embodiment of the present application provides a method for sending a packet, where the method for sending a packet includes determining whether a packet is a fragmented packet. If the packet is a fragmented packet, determining whether the number of tokens in a token bucket is sufficient. When the number of tokens in the token bucket is sufficient, sending the fragmented packet, and deducting the number of tokens in the token bucket, where the deducted number of tokens corresponds to the number of bytes of the sent fragmented packet. When the number of tokens in the token bucket is insufficient, sending the fragmented packet, and deducting the number of tokens in the token bucket, where the deducted number of tokens corresponds to the number of bytes of the sent fragmented packet, and the number of tokens in the token bucket is a negative number after the number of tokens corresponding to the number of bytes of the sent fragmented packet is deducted.

An embodiment of the present application provides an apparatus for sending a packet, where the apparatus for sending a packet includes a first determining unit, a sending unit, a first processing unit, a second processing unit, wherein the first determining unit, configured to determine whether a packet is a fragmented packet; if the packet is a fragmented packet, determine whether the number of tokens in a token bucket is sufficient; when the number of tokens in the token bucket is sufficient, trigger a sending unit and a first processing unit; and when the number of tokens in the token bucket is insufficient, trigger the sending unit and a second processing unit. The sending unit is configured to send the fragmented packet. The first processing unit is configured to deduct the number of tokens in the token bucket, where the deducted number of tokens corresponds to the number of bytes of the sent fragmented packet. The second processing unit is configured to deduct the number of tokens in the token bucket, where the deducted number of tokens corresponds to the number of bytes of the sent fragmented packet, and the number of tokens in the token bucket is a negative number after the number of tokens corresponding to the number of bytes of the sent fragmented packet is deducted.

According to the method and apparatus for sending a packet provided in the embodiments of the present application, even if tokens in a token bucket are insufficient, a fragmented packet can be sent out by using a deficit of the token bucket, so that a receiving party is capable of receiving all fragmented packets belonging to the same packet and assemble all the fragmented packets into one complete packet, thereby avoiding waste of network resources and bandwidths.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The technical solution of the present application is detailed below with reference to embodiments and accompanying drawings.

By using a method and an apparatus for sending a packet according to the embodiments of the present application, when a packet is sent, a type of the packet needs to be determined firstly; if the packet is a fragmented packet, special processing is performed; and when another fragmented packet belonging to the same packet as the fragmented packet is forwarded, even if the another fragmented packet does not meet a forwarding condition, the another fragmented packet is forwarded forcibly. This is different from a current method for sending a packet, and can ensure that all fragmented packets are forwarded.

Figure 1:
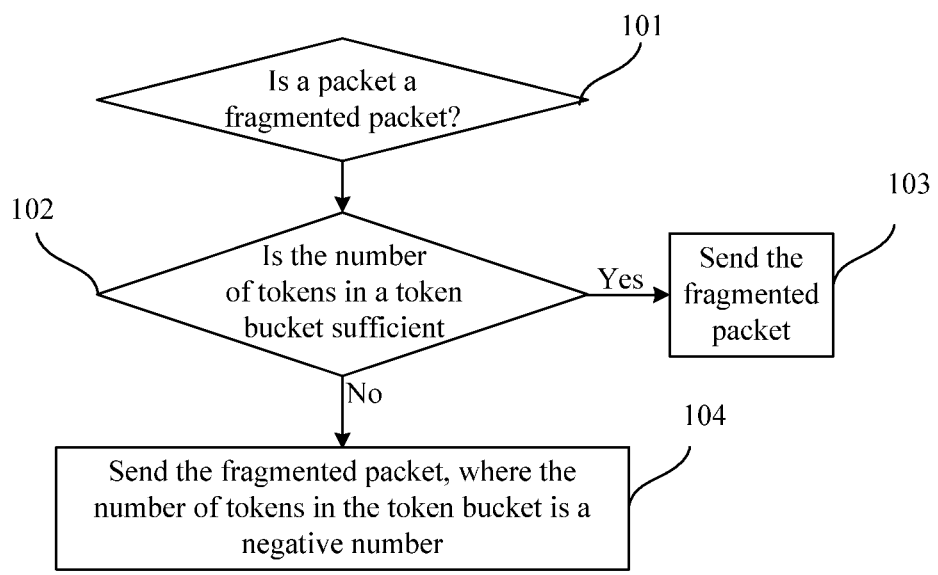
FIG. 1 is a flowchart of a method for sending a packet according to an embodiment of the present application.

FIG. 1 is a flowchart of a method for sending a packet according to an embodiment of the present application. As shown in FIG. 1, the method for sending a packet in this embodiment specifically includes:

101. Determine whether a packet is a fragmented packet.

102. If the packet is a fragmented packet, determine whether the number of tokens in a token bucket is sufficient.

103. When the number of tokens in the token bucket is sufficient, send the fragmented packet, and deduct the number of tokens in the token bucket, where the deducted number of tokens corresponds to the number of bytes of the sent fragmented packet.

104. When the number of tokens in the token bucket is insufficient, send the fragmented packet, and deduct the number of tokens in the token bucket, where the deducted number of tokens corresponds to the number of bytes of the sent fragmented packet, and the number of tokens in the token bucket is a negative number (also called a deficit of the token bucket) after the number of tokens corresponding to the number of bytes of the sent fragmented packet is deducted.

Evidently, according to the method for sending a packet in this embodiment, even if tokens in a token bucket are insufficient, a fragmented packet may be sent out by using a deficit of the token bucket, so that a receiving party is capable of receiving all fragmented packets belonging to a same packet and assemble all the fragmented packets into one complete packet, thereby avoiding waste of network resources and bandwidths.

Figure 2:
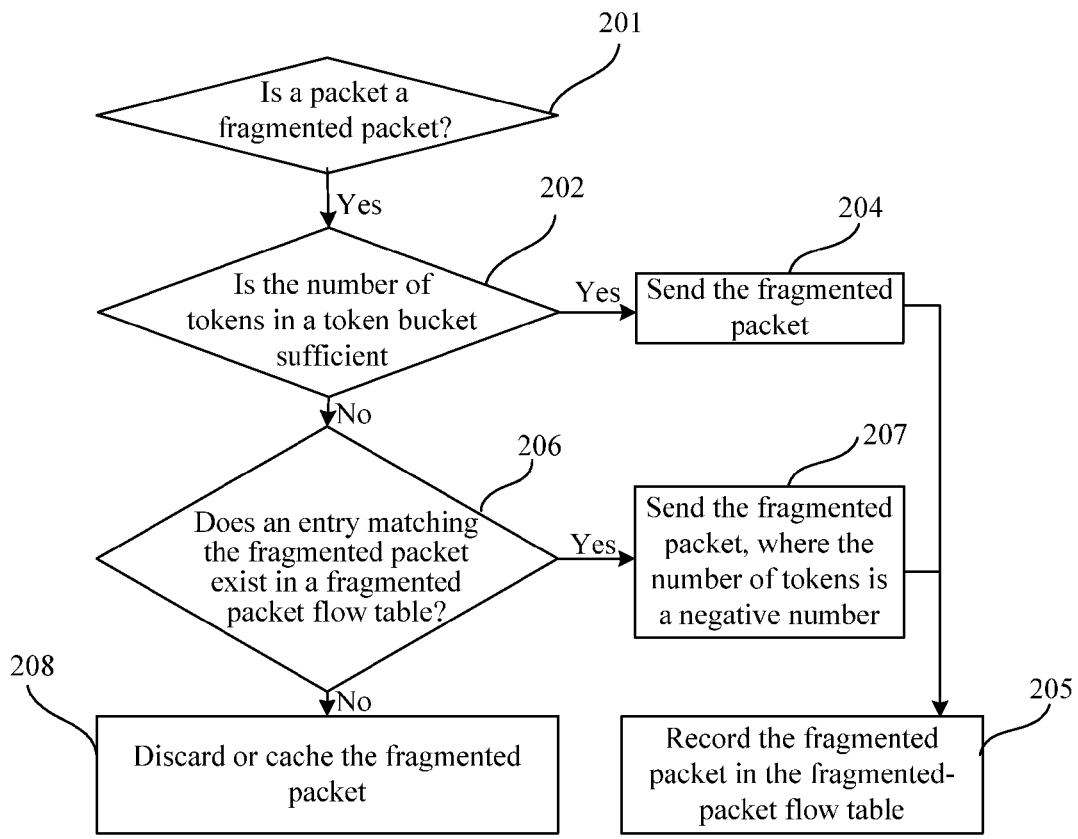
FIG. 2 is a flowchart of a method for sending a packet according to another embodiment of the present application.

Alternatively, as shown in FIG. 2, another embodiment of the present application provides a flowchart of a method for sending a packet, including:

201. Determine whether a packet is a fragmented packet, if the packet is a fragmented packet, execute 202.

202. Determine whether the number of tokens in the token bucket is sufficient, if the number of tokens in the token bucket is sufficient, execute 204; if the number of tokens in the token bucket is insufficient, execute 206.

For example, whether the number of tokens in the token bucket is sufficient is determined according to a packet length (the number of bytes) of the fragmented packet.

204. Send the fragmented packet, and deduct the number of tokens in the token bucket, where the deducted number of tokens corresponds to the number of bytes of the sent fragmented packet.

205. Record the fragmented packet in a fragmented-packet flow table.

For a fragmented packet, an identifier (Identifier, ID for short) field in a packet header can identify to which raw data packet (that is, a complete packet) the fragmented packet belongs; an offset field in the packet header can identify a position of the fragmented packet in the raw data packet; and a flag (Full name in English: Flag) field in the packet header can identify whether a packet is a fragmented packet. Therefore, in 205, preferentially, the flag field, the offset field, and the flag field in the packet header of the fragmented packet may be recorded in the fragmented-packet flow table. In another optional implementation, information of the whole packet header of the fragmented packet may be recorded in the fragmented-packet flow table.

206. Query the fragmented-packet flow table, and determine whether an entry matching the fragmented packet exists in the fragmented-packet flow table; if an entry matching the fragmented packet exists in the fragmented-packet flow table, execute 207; if an entry matching the fragmented packet does not exist in the fragmented-packet flow table, execute 208.

207. Send the fragmented packet; deduct the number of tokens in the token bucket, where the deducted number of tokens corresponds to the number of bytes of the sent fragmented packet and the number of tokens in the token bucket is a negative number; and execute 205.

If the entry matching the fragmented packet exists in the fragmented-packet flow table, it indicates that at least one fragmented packet belonging to the same packet as the fragmented packet has been sent out.

208. Discard or cache the fragmented packet.

In the embodiment of the present application, the fragmented packet may be discarded directly, or the fragmented packet may be cached firstly and continue to be processed after the number of tokens in the token bucket is sufficient or after the entry matching the fragmented packet exists in the fragmented-packet flow table.

Evidently, according to the method for sending a packet in this embodiment, even if tokens in a token bucket are insufficient, a fragmented packet can be sent out by using a deficit of the token bucket, so long as an entry matching the fragmented packet exists in a fragmented-packet flow table, so that a receiving party is capable of receiving all fragmented packets belonging to the same packet and assemble all the fragmented packets into one complete packet, thereby avoiding waste of network resources and bandwidths.

Alternatively, if it is determined that the packet is not a fragmented packet in 101 or 201, the packet can be processed according to the solution in the prior art, which is not limited in the embodiment of the present application.

Alternatively, in 205, when the fragmented packet is recorded in the foregoing fragmented-packet flow table, if at least two fragmented packets recorded in the fragmented packet flow table can already be assembled into one complete packet, a resource used to record the at least two fragmented packets in the fragmented-packet flow table is released. For example, whether the recorded fragmented packets can be completely assembled into one complete packet may be determined according to the flag fields and the offset fields in IP packet headers of the fragmented packets. Further, alternatively, 204 may be executed after 205, or 204 and 205 may be executed simultaneously; 205 may be executed after 207, or 205 and 207 may be executed simultaneously. For description convenience and brevity, this embodiment and the accompanying drawing illustrate only one case. Actually, the embodiments of the present application are not limited.

Alternatively, when the number of tokens in the token bucket is a negative number, tokens injected subsequently are preferably used to offset the deficit of the token bucket, and then tokens are added. Preferentially, an upper limit of the deficit of the token bucket may be set when the token bucket is initialized.

Figure 3:
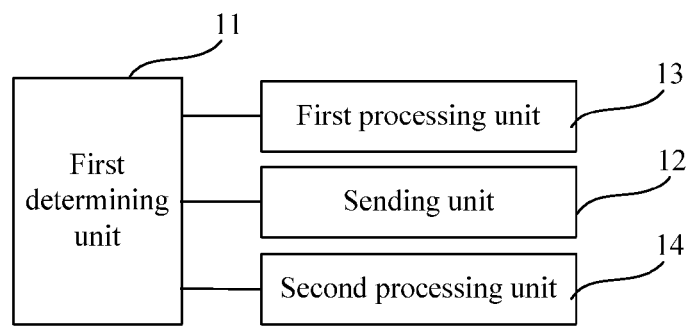
FIG. 3 is a schematic diagram of an apparatus for sending a packet according to an embodiment of the present application.

The foregoing embodiment is description of the method for sending a packet. Certainly, sending a packet may be implemented by using an apparatus for sending a packet. FIG. 3 is a schematic diagram of an apparatus for sending a packet according to an embodiment of the present application. As shown in FIG. 3, the apparatus for sending a packet in this embodiment specifically includes a first determining unit 11, a sending unit 12, a first processing unit 13, and a second processing unit 14, where:

the first determining unit 11 is configured to determine whether a packet is a fragmented packet; if the packet is a fragmented packet, determine whether the number of tokens in a token bucket is sufficient; when the number of tokens in the token bucket is sufficient, trigger the sending unit 12 and the first processing unit 13; and when the number of tokens in the token bucket is insufficient, trigger the sending unit 12 and the second processing unit 14;

the sending unit 12 is configured to send the fragmented packet;

the first processing unit 13 is configured to deduct the number of tokens in the token bucket, where the deducted number of tokens corresponds to the number of bytes of the sent fragmented packet; and the second processing unit 14 is configured to deduct the number of tokens in the token bucket, where the deducted number of tokens corresponds to the number of bytes of the sent fragmented packet, and the number of tokens in the token bucket is a negative number (also called a deficit of the token bucket) after the number of tokens corresponding to the number of bytes of the sent fragmented packet is deducted.

The apparatus for sending a packet in the embodiment of the present application, even if tokens in a token bucket are insufficient, can send out a fragmented packet by using a deficit of the token bucket, so that a receiving party is capable of receiving all fragmented packets belonging to the same packet and assemble all the fragmented packets into one complete packet, thereby avoiding waste of network resources and bandwidths.

Figure 4:
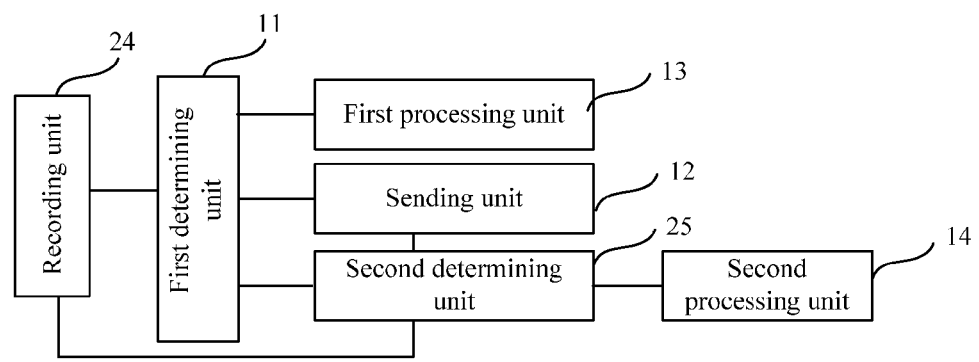
FIG. 4 is a schematic diagram of an apparatus for sending a packet according to another embodiment of the present application.

Alternatively, as shown in FIG. 4, in another embodiment of the present application, the apparatus may further include a recording unit 24 and a second determining unit 25. In this embodiment, when the number of tokens in a token bucket is sufficient, the first determining unit 11 is further configured to trigger the recording unit 24; when the number of tokens in the token bucket is insufficient, the first determining unit 11 is further configured to trigger the sending unit 12, the second processing unit 14 and the recording unit 24 through the second determining unit 25, where:

the recording unit 24 is configured to record the fragmented packet in a fragmented-packet flow table;

the second determining unit 25 is configured to query the fragmented-packet flow table, determine whether an entry matching the fragmented packet exists in the fragmented-packet flow table; and if the entries that match the fragmented packet exist in the fragmented-packet flow table, trigger the sending unit 12, the second processing unit 14 and the recording unit 24.

Figure 5:
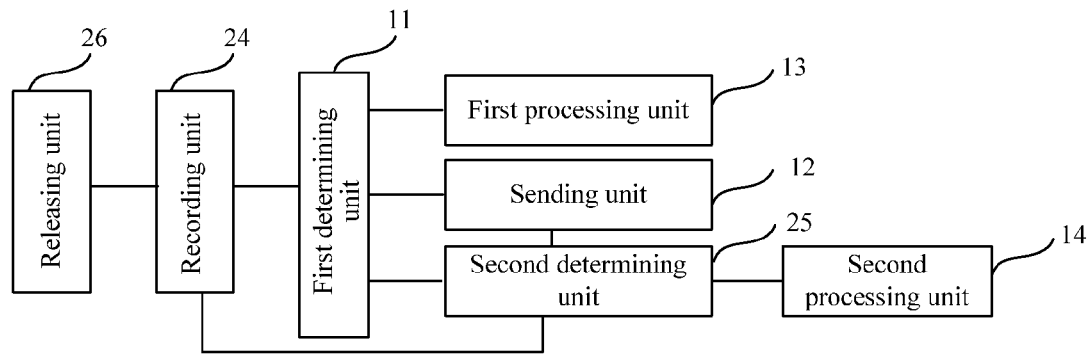
FIG. 5 is a schematic diagram of an apparatus for sending a packet according to still another embodiment of the present application.

Further, alternatively, as shown in FIG. 5, in another embodiment of the present application, the apparatus may further include a releasing unit 26. If at least two fragmented packets recorded in a fragmented-packet flow table can be assembled into one complete packet, the releasing unit 26 is configured to release a resource used to record the at least two fragmented packets in the fragmented-packet flow table.

For a sent fragmented packet, even if tokens in a token bucket are insufficient, the apparatus for sending a packet in this embodiment can send out the fragmented packet by using a deficit of the token bucket, so long as an entry matching the fragmented packet exists in a fragmented-packet flow table, so that a receiving party is capable of receiving all fragmented packets belonging to the same packet and assemble all the fragmented packets into one complete packet, thereby avoiding waste of network resources and bandwidths.

A person skilled in the art may further appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

The steps of the method or the algorithm according to the embodiments disclosed herein can be implemented by hardware or a software module executed by a processor, or implemented by a combination thereof. The software module may be stored in a random access memory (RAM), memory, read-only memory (ROM), electrically programmable ROM, electrically erasable programmable ROM, register, hard disk, removable magnetic disk, CD-ROM or any other forms of storage medium in this field.

The objectives, technical solutions, and benefits of the present application are further described in detail in the foregoing specific embodiments. It should be understood that the foregoing descriptions are merely specific embodiments of the present application, but are not intended to limit the protection scope of the present application. Any modification, equivalent replacement, or improvement made within the spirit and principle of the present application shall fall within the protection scope of the present application.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for sending a packet, the method comprising:
   determining whether the packet is fragmented;
   when the packet is a fragmented packet, determining whether a number of tokens in a token bucket is sufficient;
   when the number of tokens in the token bucket is sufficient, sending the fragmented packet, and deducting the number of tokens in the token bucket, wherein the deducted number of tokens corresponds to a number of bytes of the sent fragmented packet; and
   when the number of tokens in the token bucket is insufficient, querying a fragmented-packet flow table, and determining whether an entry that match the fragmented packet exists in the fragmented-packet flow table, and when the entry matching the fragmented packet exists, sending the fragmented packet; and
   deducting the number of tokens in the token bucket, wherein the deducted number of tokens corresponds to the number of bytes of the sent fragmented packet; and the number of tokens in the token bucket is a negative number after the number of tokens corresponding to the number of bytes of the sent fragmented packet is deducted.

2. The method according to claim 1, when the number of tokens in the token bucket is sufficient or insufficient, the method further comprising recording the fragmented packet in the fragmented-packet flow table.

3. The method according to claim 2, wherein the recording the fragmented packet in the fragmented-packet flow table comprises, in the fragmented-packet flow table, recording an identifier field, an offset field and a flag field in a packet header of the fragmented packet.

4. The method according to claim 2, when at least two fragmented packets recorded in the fragmented-packet flow table already are assemble-able into one complete packet, the method further comprising:
releasing a resource used to record the at least two fragmented packets in the fragmented-packet flow table.

5. An apparatus for sending a packet, comprising:
a first determining unit;
a sending unit;
a first processing unit;
a second processing unit; and
a recording unit;
wherein the first determining unit is configured to determine whether the packet is fragmented, to determine whether a number of tokens in a token bucket is sufficient when the packet is a fragmented packet, to trigger the sending unit and the first processing unit, when the number of tokens in the token bucket is sufficient, and to trigger the sending unit and the second processing unit when the number of tokens in the token bucket is insufficient;
wherein the sending unit is configured to send the fragmented packet;
wherein the first processing unit is configured to deduct the number of tokens in the token bucket, wherein the deducted number of tokens corresponds to a number of bytes of the sent fragmented packet;
wherein the second processing unit is configured to deduct the number of tokens in the token bucket, wherein the deducted number of tokens corresponds to the number of bytes of the sent fragmented packet, and the number of tokens in the token bucket is a negative number after the number of tokens corresponding to the number of bytes of the sent fragmented packet is deducted,
wherein, when the number of tokens in the token bucket is sufficient, the first determining unit is further configured to trigger a recording unit; when the number of tokens in the token bucket is insufficient, the first determining unit is further configured to trigger the sending unit, the second processing unit and the recording unit through a second determining unit;
wherein the recording unit is configured to record the fragmented packet in a fragmented-packet flow table; and
wherein the second determining unit is configured to query the fragmented-packet flow table, determine whether an entry matching the fragmented packet exists in the fragmented-packet flow table; and when the entry matching the fragmented packet exists in the fragmented-packet flow table, trigger the sending unit, the second processing unit, and the recording unit.

6. The apparatus according to claim 5, further comprising a releasing unit, wherein when at least two fragmented packets recorded in the fragmented-packet flow table can already be assembled into one complete packet, the releasing unit is configured to release a resource used to record the at least two fragmented packets in the fragmented-packet flow table.

7. An apparatus, comprising a non-transitory computer-readable storage medium storing program be executed by the computer, the program including instructions for:
determining whether the packet is fragmented;
when the packet is a fragmented packet, determining whether a number of tokens in a token bucket is sufficient;
when the number of tokens in the token bucket is sufficient, sending the fragmented packet, and deducting the number of tokens in the token bucket, wherein the deducted number of tokens corresponds to a number of bytes of the sent fragmented packet; and
when the number of tokens in the token bucket is insufficient, querying a fragmented-packet flow table, and determining whether an entry that match the fragmented packet exists in the fragmented-packet flow table; and
when the entry matching the fragmented packet exists, sending the fragmented packet and deducting the number of tokens in the token bucket, wherein the deducted number of tokens corresponds to the number of bytes of the sent fragmented packet; and the number of tokens in the token bucket is a negative number after the number of tokens corresponding to the number of bytes of the sent fragmented packet is deducted.

8. The apparatus according to claim 7, where the program further comprises instructions for: recording the fragmented packet in the fragmented-packet flow table.

9. The apparatus according to claim 8, wherein the recording the fragmented packet in the fragmented-packet flow table comprises, in the fragmented-packet flow table, recording an identifier field, an offset field and a flag field in a packet header of the fragmented packet.

10. The apparatus according to claim 8, where the program further comprises: releasing a resource used to record the at least two fragmented packets in the fragmented-packet flow table, when at least two fragmented packets recorded in the fragmented-packet flow table already are assemble-able into one complete packet.

11. An apparatus comprising:
a memory, and
a processor coupling with the processor, where the processor is configured to determine whether the packet is fragmented;
when the packet is a fragmented packet, determine whether a number of tokens in a token bucket is sufficient;
when the number of tokens in the token bucket is sufficient, send the fragmented packet, and deduct the number of tokens in the token bucket, wherein the deducted number of tokens corresponds to a number of bytes of the sent fragmented packet; and
when the number of tokens in the token bucket is insufficient, query a fragmented-packet flow table in the memory, and determine whether an entry that match the fragmented packet exists in the fragmented-packet flow table; and
when the entry matching the fragmented packet exists, send the fragmented packet and deduct the number of tokens in the token bucket, wherein the deducted number of tokens corresponds to the number of bytes of the sent fragmented packet; and the number of tokens in the token bucket is a negative number after the number of tokens corresponding to the number of bytes of the sent fragmented packet is deducted.

12. The apparatus according to claim 11, where the processor further configured to record the fragmented packet in the fragmented-packet flow table.

13. The apparatus according to claim 12, wherein the recording the fragmented packet in the fragmented-packet flow table comprises, in the fragmented-packet flow table, recording an identifier field, an offset field and a flag field in a packet header of the fragmented packet.

14. The apparatus according to claim 12, where the processor further configured to release a resource used to record the at least two fragmented packets in the fragmented-packet flow table, when at least two fragmented packets recorded in the fragmented-packet flow table already are assemble-able into one complete packet.

\* \* \* \* \*